(12) United States Patent
Xiong et al.

(10) Patent No.: US 11,662,314 B2
(45) Date of Patent: May 30, 2023

(54) SYSTEM AND METHOD OF INLINE DEPOSIT DETECTION IN PROCESS FLUID

(71) Applicant: Ecolab USA Inc., St. Paul, MN (US)

(72) Inventors: Kun Xiong, Naperville, IL (US); Xuejun Wang, Oswego, IL (US); William A. Von Drasek, Oak Forest, IL (US); Brandon Davis, Oswego, IL (US)

(73) Assignee: Ecolab USA Inc., St. Paul, MN (US)

( * ) Notice: Subject to any disclaimer, the term of this patent is extended or adjusted under 35 U.S.C. 154(b) by 204 days.

(21) Appl. No.: 17/078,836

(22) Filed: Oct. 23, 2020

(65) Prior Publication Data

US 2021/0123865 A1 Apr. 29, 2021

Related U.S. Application Data

(60) Provisional application No. 62/925,430, filed on Oct. 24, 2019.

(51) Int. Cl.
*G01N 21/64* (2006.01)
*G08B 21/18* (2006.01)
(Continued)

(52) U.S. Cl.
CPC ......... *G01N 21/6456* (2013.01); *B08B 9/023* (2013.01); *G01N 17/008* (2013.01);
(Continued)

(58) Field of Classification Search
CPC ........... G01N 21/6456; G01N 21/6486; G01N 21/94; G01N 17/008; G01N 2021/8416; B08B 9/023; G08B 21/182
See application file for complete search history.

(56) References Cited

U.S. PATENT DOCUMENTS

| 4,506,540 A | 3/1985 | Marsh |
| 4,916,317 A | 4/1990 | Gabriel et al. |

(Continued)

FOREIGN PATENT DOCUMENTS

| CN | 206772838 U | 12/2017 | |
| CN | 108474742 A * | 8/2018 | ............ B01D 61/12 |

(Continued)

OTHER PUBLICATIONS

Fischer et al., "Optical sensing of microbial life on surfaces," *Applied and Environmental Microbiology*, 82(5): 1362-1371 (2016).

(Continued)

*Primary Examiner* — David P Porta
*Assistant Examiner* — Jeremy S Valentiner
(74) *Attorney, Agent, or Firm* — Leydig, Voit & Mayer, Ltd.

(57) ABSTRACT

The disclosed systems and method utilize the autofluorescence, optic imaging, and heat transfer resistance technologies to monitor the same simulated surface area for deposits. The systems and methods may provide continuous monitoring, detection, characterization and quantification of deposits. Utilizing this information, an associated control system may initiate alarms, initiate a chemical treatment operation, and adjust corresponding chemical treatment and preventive protocols to minimize and/or eradicate the issue.

20 Claims, 9 Drawing Sheets

(51) Int. Cl.
*G01N 17/00* (2006.01)
*B08B 9/023* (2006.01)
*G01N 21/94* (2006.01)
*G01N 21/84* (2006.01)

(52) U.S. Cl.
CPC ......... *G01N 21/64* (2013.01); *G01N 21/6486* (2013.01); *G01N 21/94* (2013.01); *G08B 21/182* (2013.01); *C02F 2303/20* (2013.01); *C02F 2303/22* (2013.01); *G01N 2021/8416* (2013.01)

(56) References Cited

U.S. PATENT DOCUMENTS

| | | | |
|---|---|---|---|
| 6,475,394 | B2 | 11/2002 | Xiong et al. |
| 7,190,457 | B2 | 3/2007 | Tabacco et al. |
| 7,581,874 | B2 | 9/2009 | Hays et al. |
| 7,741,108 | B2 * | 6/2010 | Saxena ............... G01N 21/8507 435/288.7 |
| 8,489,240 | B2 | 7/2013 | Wan et al. |
| 8,945,371 | B2 | 3/2015 | Kouznetsov et al. |
| 8,970,829 | B2 | 3/2015 | Caussin De Schneck et al. |
| 9,128,010 | B2 | 9/2015 | Kahaian et al. |
| 9,772,303 | B2 | 9/2017 | Xiong et al. |
| 9,810,676 | B2 | 11/2017 | Xiong et al. |
| 9,970,919 | B2 | 5/2018 | Oyj |
| 10,444,147 | B2 * | 10/2019 | Cader ..................... G01N 21/94 |
| 2003/0173302 | A1 | 9/2003 | Xiong et al. |
| 2006/0246595 | A1 | 11/2006 | Banks et al. |
| 2013/0233796 | A1 | 9/2013 | Rao et al. |
| 2017/0363535 | A1 | 12/2017 | Bucs et al. |
| 2018/0001262 | A1 | 1/2018 | Rao et al. |
| 2018/0017490 | A1 | 1/2018 | Cader et al. |
| 2018/0022621 | A1 * | 1/2018 | Von Drasek ........... G01N 25/18 382/103 |
| 2018/0024031 | A1 | 1/2018 | Von Drasek et al. |
| 2018/0024043 | A1 | 1/2018 | Arumugam et al. |
| 2018/0073996 | A1 | 3/2018 | Chattoraj et al. |
| 2019/0145722 | A1 | 5/2019 | Myers et al. |
| 2019/0162650 | A1 | 5/2019 | Vallis |

FOREIGN PATENT DOCUMENTS

| | | |
|---|---|---|
| DE | 19721810 C2 | 4/2001 |
| DE | 10341397 A1 | 3/2005 |
| DE | 102011101934 B4 | 7/2017 |
| EP | 1534851 B1 | 7/2011 |
| KR | 10-0446968 B1 | 9/2004 |
| KR | 10-1918490 B1 | 11/2018 |
| WO | WO 2006/118876 A2 | 11/2006 |
| WO | WO 2019/020816 A2 | 1/2019 |

OTHER PUBLICATIONS

Fischer et al., "A UV-LED Based Optical Fiber Biofilm Sensor: Design, Calibration, and Field Application," *Oceanology International 2012*, 18 pp. (Mar. 13-15, 2012).

European Patent Office, International Search Report in International Patent Application No. PCT/US2020/057083, 5 pp. (dated Feb. 9, 2021).

European Patent Office, Written Opinion in International Patent Application No. PCT/US2020/057083, 12 pp. (dated Feb. 9, 2021).

Chattoraj, "Online measurement and control of microbiological activity in industrial water systems," *Materials Performance*, 41(4), (Apr. 2002).

* cited by examiner

SYSTEM AND METHOD OF INLINE DEPOSIT DETECTION IN PROCESS FLUID

CROSS-REFERENCE TO RELATED APPLICATIONS

This patent application claims the benefit of U.S. Provisional Patent Application No. 62/925,430, filed Oct. 24, 2019, which is incorporated herein by reference for all purposes.

TECHNICAL FIELD

This patent disclosure relates generally to deposit detection in fluid handling system, and, more particularly, the invention pertains to such detection, classification, quantification, and treatment in an industrial water system.

BACKGROUND

In fluid handling systems, maintaining surfaces in contact fluid free of deposits and cleaning such surfaces can be essential to providing desired operation and efficiency of associated equipment. For example, maintaining deposit-free heat exchange surfaces in water systems, particularly in industrial water systems, e.g., cooling water systems and heating water systems, is important to optimizing energy efficiency. Mineral deposit, particularly calcium salts, and more particularly calcium carbonate, may be in the form of scaling or fouling. Generally, scaling is the precipitation of inorganic salts on equipment surfaces, and fouling results from deposit of insoluble particles suspended in a liquid. Biofilm fouling on heat exchange surfaces can also cause inefficiency in industrial water systems. For example, compared to mineral deposit, biofilm fouling is generally a 4 to 5 times better insulator than mineral deposit. Generally, biofilms are slimy, and the microorganisms causing the formation of biofilm fouling may represent merely a small fraction of the biofilm's content.

Monitoring industrial water systems to reduce or prevent deposit (biofilm, mineral, corrosion, or otherwise) onto heat exchange surfaces can provide information that can be utilized to improve, or at least maintain, efficiency in an industrial water system's operation and/or treatment program. In order to achieve optimum performance of the system, the chemical treatment products may be introduced into an industrial water system as a preventative measure in order to minimize the accumulation of biofouling. Should deposits accumulate on surfaces, however, chemical treatment products introduced in the system may require alteration or adjustment. Further, actions may be required in order to reduce or eliminate such deposits. Possible actions to be taken will be dependent upon the type of deposit accumulated. For example, the introduction of a chemical treatment program may be utilized to treat an accumulation of biofilm, while another chemical treatment program or physical intervention may be required in order to treat deposit such as mineral scale.

SUMMARY

The disclosed systems and method utilize the autofluorescence, optic imaging, and heat transfer resistance technologies to concurrently monitor the same simulated surface area for deposits. The systems and methods may provide continuous monitoring, detection, characterization and quantification of deposits. Utilizing this information, an associated control system may initiate alarms, initiate a chemical treatment or physical intervention operation, and adjust corresponding treatment chemicals and preventive protocols to minimize and/or eradicate the issue.

The disclosure describes, in one aspect, a system for analyzing deposit within a fluid handling system. The system for analyzing deposit includes a conduit that is adapted to be fluidly coupled to the fluid handling system to receive a flow of representative fluid from the fluid handling system. Contained within the conduit is a substrate that includes a surface disposed to contact the flow of representative fluid. The substrate is representative of a system surface within the fluid handling system. A temperature modification element is disposed to modify the temperature of the substrate. At least one temperature sensor is disposed to measure a temperature transmitted through the substrate in order to determine heat transfer resistance of the substrate. At least one fluorometer is disposed to monitor fluorescence of the surface of the substrate at a plurality of fluorometer locations along the substrate, and at least one camera is disposed to provide optical images of the surface of the substrate at a plurality of camera locations. The resultant heat transfer data, fluorescence and optical images may be analyzed in order to identify what, if any deposit has accumulated. In at least one embodiment, the system for analyzing deposit includes multiple cameras and/or multiple fluorometers disposed at a plurality of locations in order to acquire data along the substrate.

In at least one embodiment, the determination of the type of deposit may be utilized to determine what, if any, action should take place. For example, the data may be utilized in order to initiate an appropriate chemical treatment program to the representative fluid flow into the system for analyzing. Alternatively or additionally, such chemical treatment program may be provided to the fluid handling system, and/or an additive introduced to the fluid handling system may be modified. In another example, steps may be taken to introduce a cleaning treatment or physically clean the substrate in order to remove mineral deposits.

In at least one embodiment, the system for analyzing deposit includes a moveably mounted fluorometer and/or a movably mounted camera in order to acquire data along the substrate.

In at least one embodiment, the system for analyzing deposit includes a motor adapted to move at least one of the camera to the plurality of camera locations and/or the fluorometer to the plurality of fluorometer locations.

In at least one embodiment, the system for analyzing deposit includes a controller configured to receive data from the at least one temperature sensor, the fluorometer and the camera, determine a level of heat transfer resistance through the substrate, and determine at least one of a nature of the deposit and a level of the deposit based upon data from at least one of the fluorometer, the camera, and the temperature sensor, the controller further being configured to control operation of the motor.

In at least one embodiment, the system for analyzing includes a plurality of temperature sensors, the plurality of temperature sensors including a substrate temperature sensor.

In at least one embodiment, the system for analyzing deposit includes at least one of an ambient temperature sensor, a representative fluid inflow temperature sensor, and a representative fluid outflow temperature sensor.

In at least one embodiment of the system for analyzing deposit, the conduit is adapted to be fluidly coupled to a supply of a chemical treatment for selectively supplying a flow of the chemical treatment to the substrate.

In at least one embodiment, the system for analyzing deposit includes a supply of the chemical treatment fluidly coupled to selectively supply a flow of the chemical treatment to the substrate.

In at least one embodiment of the system for analyzing deposit, the conduit includes an inside surface, the inside surface including the substrate.

In at least one embodiment of the system for analyzing deposit, at least a portion of the conduit is transparent.

In at least one embodiment, the system for analyzing deposit further includes a control system including at least one controller. The controller is configured to receive data from the at least one temperature sensor, the at least one fluorometer and the at least one camera, determine a level of heat transfer resistance through the substrate based upon at least one of temperature data received from the at least one temperature sensor, and at least one of characterize deposits or determine a level of deposits based upon at least one of fluorescence data from the fluorometer, optical data images received from the camera, and heat transfer resistance.

In at least one embodiment of the system for analyzing deposit, the controller is further configured to send out an alarm when at least one of a threshold type and level or preset type and level of deposit is identified on the surface of the substrate.

In at least one embodiment, the system for analyzing deposit is configured to initiate a chemical treatment when at least one of a threshold type and level or preset type and level of deposit is identified on the surface of the substrate.

In at least one embodiment of the system for analyzing, the controller is configured to adjust a deposit and scale control program based upon data received from at least one of the at least one temperature sensor, the fluorometer and the camera, and the type of and level of deposit identified.

In at least one embodiment of the system for analyzing deposit, the controller is configured to adjust at least one of a biocide program for preventative treatment and biofilm inhibition treatment program based upon data received from at least one of the at least one temperature sensor, the fluorometer and the camera and the type and level of deposit identified.

In at least one embodiment, the controller of the system for analyzing deposit is configured to determine a type of deposit based upon at least one of (1) where both fluorescence data received from the fluorometer and optical data images received from the camera are positive, then determining that biofouling exists; (2) where optical data images received from the camera are positive, and fluorescence data received from the fluorometer is negative, then determining that mineral scale or fouling exists; and (3) determining a treatment program specific to the type of deposit identified for corrective action.

In at least one embodiment of the system for analyzing the fluid handling system is an industrial water system.

The disclosure also describes, in another aspect, a method of determining deposit within a fluid handling system. The method includes providing a flow of the representative fluid from the fluid handling system to a surface of a substrate representative of a system surface within the fluid handling system, providing temperature altering conditions to an opposed surface of the substrate, measuring heat transfer resistance through the substrate to the representative fluid, monitoring fluorescence of the surface of the substrate at a plurality of locations along the substrate, acquiring optical images of the surface at a plurality of locations along the substrate, and characterizing a nature of a deposit on the surface of the substrate based upon at least one of the monitored fluorescence, the optical images, and the heat transfer resistance. In at least on embodiment the method includes both characterizing the nature of a deposit on the surface of the substrate and the level of deposit on the surface of the substrate based upon at least one of the monitored fluorescence, the optical images, and the heat transfer resistance. In at least one embodiment, the method of determining deposit within a fluid handling system includes both characterizing the nature of a deposit on the surface of the substrate and the level of deposit on the surface of the substrate based upon at least one of the monitored fluorescence, the optical images, and the heat transfer resistance.

In at least one embodiment of the method of determining deposit within a fluid handling system, providing a flow of the representative fluid from the fluid handling system to a surface of a substrate representative of a system surface within the fluid handling system includes providing a substrate that includes a similar material and surface roughness as the system surface within the fluid handling system.

In at least one embodiment of the method of determining deposit within a fluid handling system, providing the flow of the representative fluid from the fluid handling system includes providing the flow of representative fluid to a conduit including the substrate.

In at least one embodiment, the method of determining deposit within a fluid handling system includes fluidly coupling the conduit to the fluid handling system.

In at least one embodiment of the method of determining deposit within a fluid handling system, providing a flow or representative fluid includes providing a flow of representative fluid that simulates a shear stress experienced by fluid within the fluid handling system.

In at least one embodiment of the method of determining deposit within a fluid handling system, providing temperature altering conditions to an opposed surface includes providing temperature altering conditions that simulate temperature conditions representative of temperatures experienced by the system surface within the fluid handling system.

In at least one embodiment of the method of determining deposit within a fluid handling system, measuring heat transfer resistance through the substrate to the representative fluid includes measuring a representative fluid outflow temperature.

In at least one embodiment of the method of determining deposit within a fluid handling system, measuring heat transfer resistance through the substrate includes measuring at least one of an ambient temperature, a temperature of representative fluid flowing to the substrate, a temperature of the surface of the substrate, and a temperature of the temperature modification element.

In at least one embodiment of the method of determining deposit within a fluid handling system, measuring the fluorescence includes moving a fluorometer to a plurality of fluorometer locations along the substrate and measuring the fluorescence of the surface of the substrate at the plurality of fluorometer locations.

In at least one embodiment of the method of determining deposit within a fluid handling system, acquiring optical images includes moving a camera to a plurality of camera locations along the substrate and providing optical images of the surface of the substrate at a plurality of camera locations.

In at least one embodiment of the method of determining deposit within a fluid handling system, measuring the fluorescence includes acquiring measuring fluorescence with a plurality of fluorometers disposed at a plurality of fluorometer locations.

In at least one embodiment of the method of determining deposit within a fluid handling system, acquiring optical images includes acquiring optical images from a plurality of cameras at a plurality of camera locations.

In at least one embodiment, the method of determining deposit within a fluid handling system further includes performing a mechanical cleaning of the surface of the substrate when at least one of a predetermined type of deposit and a predetermined level of deposit is determined.

In at least one embodiment, the method of determining deposit within a fluid handling system further includes selectively supplying a flow of a chemical treatment to the substrate.

In at least one embodiment, the method of determining deposit within a fluid handling system further includes supplying a flow of the chemical treatment to the substrate when at least one of a predetermined type of deposit and a predetermined level of deposit is determined.

In at least one embodiment, the method of determining deposit within a fluid handling system further includes stopping a flow of the chemical treatment to the substrate, and restarting at least one of measuring heat transfer resistance through the substrate to the representative fluid; monitoring fluorescence of the surface of the substrate; acquiring optical images of the surface of the substrate; and determining at least one of a type of and a level of deposit on the surface of the substrate based upon at least one of the monitored fluorescence, the monitored optical images, and heat transfer resistance.

In at least one embodiment of the method of determining deposit within a fluid handling system, monitoring fluorescence of the surface of the substrate includes monitoring the surface of the substrate through a transparent conduit, and acquiring optical images of the surface of the substrate includes acquiring optical images of the surface of the substrate through the transparent conduit.

In at least one embodiment of the method of determining deposit within a fluid handling system further includes providing data from at least one temperature sensor, at least one fluorometer and at least one camera to a control system including at least one controller.

In at least one embodiment, the method of determining deposit within a fluid handling system further includes sending out an alarm when a predetermined type and level of deposit are determined.

In at least one embodiment, the method of determining deposit within a fluid handling system further includes adjusting a deposit and scale control program based upon data received from at least one of the at least one temperature sensor, the fluorometer and the camera, and the type and level of deposit identified.

In at least one embodiment, the method of determining deposit further includes adjusting at least one of a biocide program for preventative treatment and biofilm inhibition treatment program based upon data received from at least one of the at least one temperature sensor, the fluorometer and the camera and the type and level of deposit identified.

In at least one embodiment, the method of determining deposit further includes determining basic deposit based upon at least one of (1) where both fluorescence data received from the fluorometer and optical data images received from the camera are positive, then determining that biofouling exists; and (2) where optical data images received from the camera is positive, and fluorescence data received from the fluorometer is negative, and the level of heat transfer resistance does not indicate corrosion, then determining that general deposits or scale exist.

In at least one embodiment of the method of determining deposit, the fluid handling system is an industrial water system.

In at least one embodiment, the method of determining deposit further includes at least one of chemically treating and cleaning the surface of the substrate to create a cleaned surface, acquiring optical images of the cleaned surface of the substrate, and comparing the optical images of the cleaned surface of the substrate with a previously acquired digital image of the substrate, and identifying if corrosion changes have occurred to the cleaned surface of the substrate.

In at least one embodiment, the method of determining deposit further includes draining the representative fluid from the surface of the substrate prior to monitoring fluorescence of the surface of the substrate and acquiring optical images of the surface of the substrate.

In at least one embodiment, the method of determining deposit further includes performing an image analysis to characterize corrosion as general or local, combining analyzed results with process monitoring data, and adjusting a corrosion inhibitor treatment program based on corrosion level and type.

BRIEF DESCRIPTION OF THE DRAWING(S)

FIG. 1 schematically illustrates an exemplary arrangement of a system for analyzing deposit according to teachings of this disclosure;

FIG. 2 schematically illustrates an alternate exemplary arrangement of a system for analyzing deposit according to teachings of this disclosure;

FIG. 3 schematically illustrates an exemplary control system for a system for analyzing deposit according to teachings of this disclosure;

DETAILED DESCRIPTION

Figure 1:
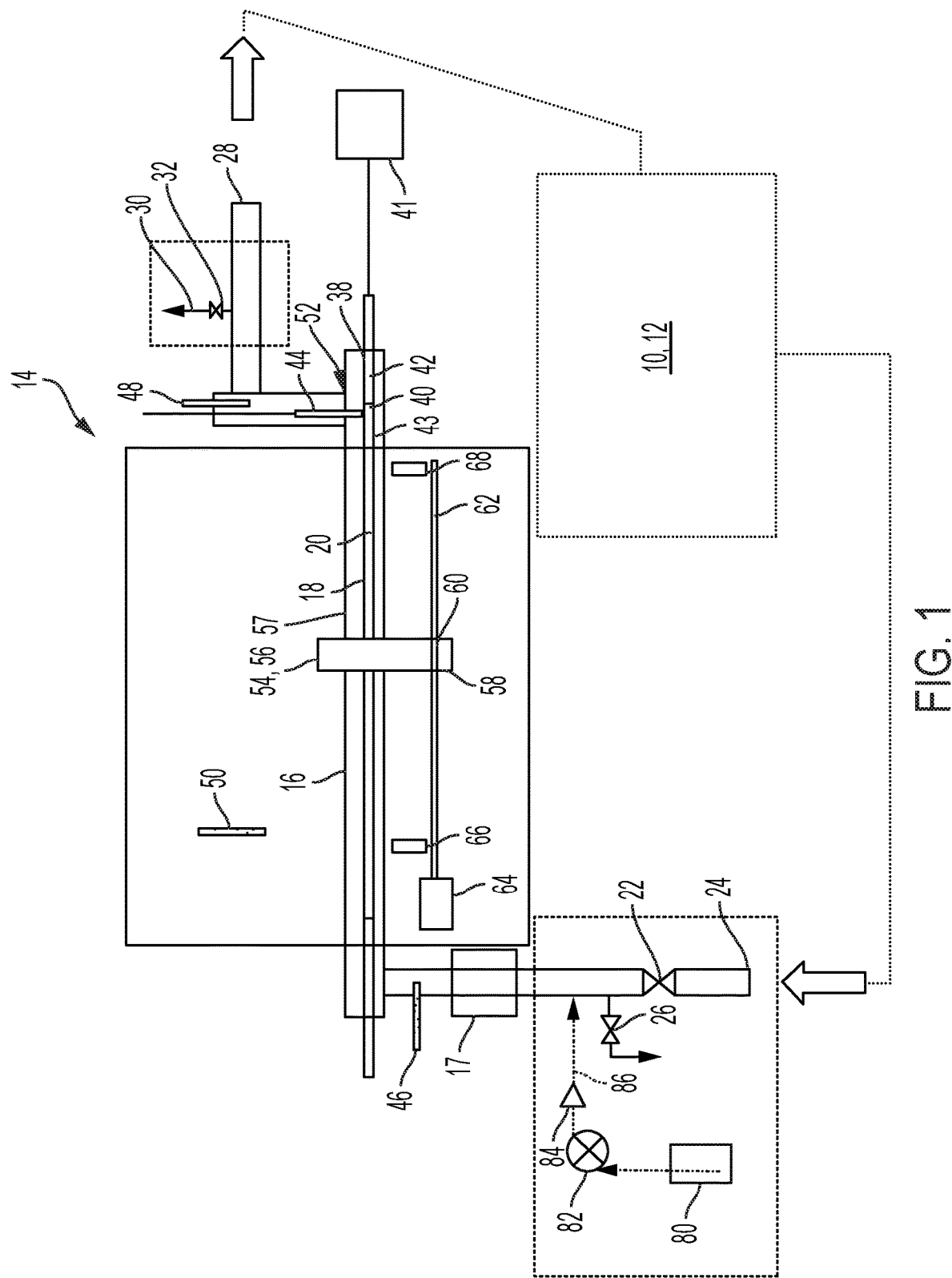

This disclosure relates to a system for determining deposit and a level of deposits within a fluid handling system, and a method of such analysis. This disclosure incorporates by reference, the entire disclosures of U.S. Publications 2018/0001262, 2018/0017490, 2018/0024031, 2018/0022621, and 2019/0145722 and U.S. Pat. Nos. 6,475,394, 9,772,303 and 9,810,676 for all purposes. Further, for purposes of this disclosure, the following terms have the definitions set forth below:

"Deposit" means foreign substances on a surface that may result from suspended solids and/or process contamination, or reaction of a fluid with the surface. "Deposit" includes mineral deposits, corrosion, biofilm fouling, and combined types. Mineral deposits may include, for example, calcium salts, iron, and magnesium, which may be in the form of scaling or fouling. Generally, scaling is the precipitation of inorganic salts on surfaces, and fouling results from deposit of insoluble particles suspended in a liquid. Suspended solids may include, for example, soil particles such as silt, sand, or clay introduced by water and air scrubbing, pollen, and particles, etc., carried by those media. Process contamination may include, for example, any contamination of water or primary process fluids by other process fluids like organic contaminations. Generally, biofilms or biofilm fouling arises from contamination in the fluid of fluid systems that can result in microbial growth on wetted surfaces. Microbial growth may start with a few cells depositing on a surface, which may increase over time into fully formed biofilms—a population of microbial organisms in a matrix of organic materials produced by the microbial organisms' contamination in the fluid of fluid systems can result in microbial growth on themselves.

"Fluid" means a liquid or flowable substance.

"Fluid handling system" means any system wherein a fluid is circulated. An example of a fluid handling system is an industrial water system.

"Industrial water system" means any system that circulates water as its primary ingredient. Examples of "industrial water systems" may include cooling systems, heating systems, membrane systems, paper making process or any other system that circulates water as defined above.

"Protocol" means a set of instructions that may include concentrations, flow rates, mixing rates, temperatures, volumes, masses, or any number of other criteria known to those skilled in the art. As related to this invention, a "protocol" may control the mixing and/or injection of treatment into the water of an industrial water system. A "protocol" can be created and/or stored using an electronic input-output device, which may be a computer, a programmable logic controller (PLC), or any input-output device programmed with the appropriate software and/or firmware, which communicates the instructions to carry out the "protocol" in an automated fashion. Additionally, the "protocol" includes optimization methods and techniques based on physical models, empirical models, semi-empirical models, or a combination of models to develop a set of instructions.

"Sensor" means a measurement device that measures a parameter and is capable of outputting the measured parameter.

"Water" means any substance that has water as a primary ingredient. Water may include pure water, tap water, fresh water, brine, steam, and/or any chemical, solution, or blend that is circulated in an industrial water system.

Turning to FIG. 1 there is illustrated an exemplary fluid handling system 10. While the details are the exemplary fluid handling system 10 are not illustrated in detail, those of skill in the art will appreciate that such a fluid handling system 10 may include an industrial water system 12 what circulates water as its primary ingredient. While not illustrated in detail, industrial water systems may include, for example, cooling systems, heating systems, membrane systems, paper making process or any other system that circulates water.

In accordance with the disclosure, there is provided a system for analyzing deposit 14 within a fluid handling system 10. The system for analyzing deposit 14 may be disposed as a separate arrangement that includes a fluid connection 24 or the like fluidly coupling the system for analyzing deposit 14 to the fluid handling system 10, or the system for analyzing deposit 14 may be incorporated into the fluid handling system 10. The system for analyzing deposit 14 may be selectively fluidly coupled to or within the fluid handling system 10 by any appropriate arrangement.

The system for analyzing deposit 14 includes a conduit 16 housing a substrate 18. The substrate 18, and, more specifically, the substrate surface 20 may be formed of any appropriate material representative of the surface within the fluid handling system 10. The surface 20 of the substrate 18 is preferably of the same material type and surface characteristics, as well as held at the same surface temperature as surfaces within the fluid handling system 10 such that representative fluid flow across the surface 20 at a rate similar to that exhibited within the fluid handling system 10 will result in similar shear stress on the surface 20.

By way of example only, the surface 20 may be a metal surface, such as type 304 stainless steel, type 316L stainless steel, low carbon steel (Grades 1010 to 1022), admiralty brass, copper, 90:10 copper nickel, 70:30 copper nickel, aluminum 7075, Monel®, titanium, titanium alloys, aluminum bronze, and galvanized steel. The surface 20 may alternatively be formed of a nonmetal surface, such as wood, or a polymeric material such as polyvinylchloride (PVC) or polypropylene.

The surface 20 of the substrate 18 additionally preferably presents a surface roughness such that the shear stress of representative fluid flowing across the surface 20 is representative of the surface within the fluid handling system 10. By way of example only, the surface roughness may be presented as Grade Ra range [0.025 to 50] um (ISO grade numbers [N1-N12]), and yield a shear stress as liquid linear velocity of [0-15] ft/s at a surface temperature range of −4° F.-212° F. (−20° C.-100° C.). In a more specific example, the surface roughness may be presented as Grade Ra range 0.3-0.7 um (ISO grade numbers N4-N7), and yield a shear stress as liquid linear velocity of 0-8 ft/s at a surface temperature range of 40° F.-150° F. (4° C.-65°).

The conduit 16 is fluidly coupled to the fluid handling system 10 to receive a flow of representative fluid from the fluid handling system 10. Preferably, flow through the conduit 16 substantially simulates flow through the fluid handling system 10 itself. In this regard, a flow meter 17 may be provided to monitor the flow to the conduit 16. In the exemplary embodiment of FIG. 1, an inlet valve 22 is provided in a fluid connection 24 that is fluidly coupled to flow within the fluid handling system 10. In the embodiment of FIG. 1, the inlet valve 22 may be a flowrate controlled valve. In this way, fluid flowing across the surface 20 substantially simulates the conditions of fluid flowing across the surface within the fluid handling system 10, including shear stresses.

The inlet valve 22 may be selectively operated to provide or prevent flow from the fluid handling system 10 to the system for analyzing deposit 14. In at least one embodiment, there is further provided an inlet side drain valve 26 that may be utilized in concert with valve 32, for example, to drain the system for analyzing deposit 14 or cleaning the surface 20.

Figure 2:
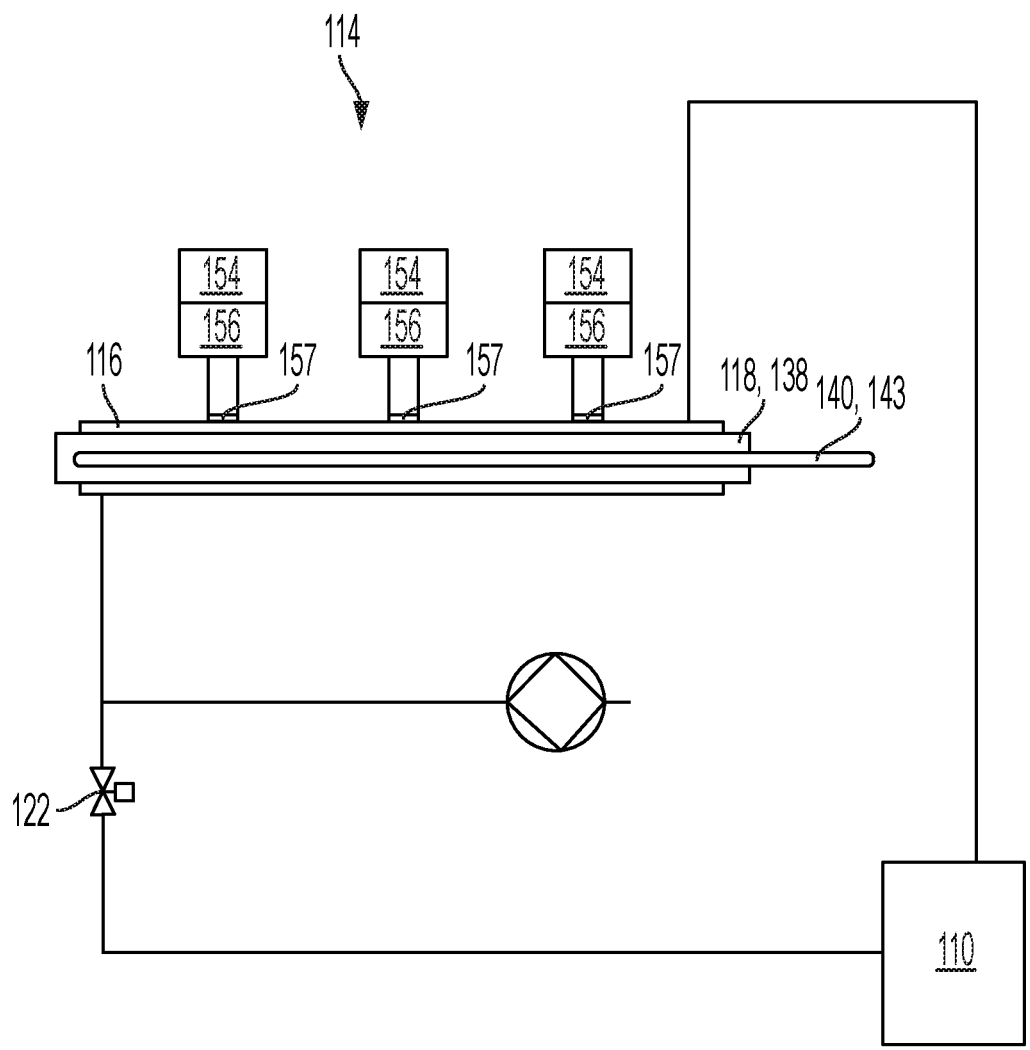

Flow from the system for analyzing deposit 14 may be directed as appropriate. For example, as illustrated in FIG. 1, flow may be directed back to the fluid handling system 10 in some embodiments (see fluid connection 28). In order to selectively direct flow to a drain 30, however, an outlet valve 32 may be provided. In this way, if it is undesirable to direct flow back to the fluid handling system 10, the outlet valve 32 may direct the flow to a drain 30. In at least one embodiment, such as the embodiment of FIG. 2, the representative fluid flowing from the system for analyzing deposit 114 may be directed to the fluid handling system 110. In FIG. 2, the reference numbers of FIG. 1 are utilized for the same or similar components, adding a "1" prior to the number, that is "1xx".

The conduit 16 may likewise be of any appropriate design. For example, the conduit 16 may be a tube through which fluid flows, or a tank through which fluid is directed. In at least one embodiment, the conduit 16 is a quartz glass tube, and the substrate 18 is a separate element that is disposed within the conduit 16. The substrate 18 may be, for example, at least a portion of a tubular structure 38 extending within the conduit 16. In at least one embodiment, the conduit 16 itself includes at least a section that forms the substrate 18 and presents the surface 20 within the conduit 16. The surface 20 may include a single surfaces or a plurality of surfaces, and may have any surface contour. For example, the surface 20 may be convex, concave, or flat, or any combination of the same.

According to an aspect of this disclosure, the system for analyzing deposit 14 further includes a temperature modification element 40 disposed to modify the temperature of the substrate 18. For the purposes of this disclosure and the appended claims, modification of the temperature of the substrate is to be understood an application of a temperature other than the temperature of the representative fluid flowing past the substrate 18. The temperature modification element 40 may be, for example, a heating element or a cooling element.

The temperature modification element 40 may be of any appropriate design and may be disposed at any appropriate position relative to the substrate 18 so long as it applies a temperature that may be transmitted through at least a portion of substrate 18 to the surface 20 configured to be disposed adjacent the representative fluid. The operation of the temperature modification element 40 may be controlled by a relay 41, such as a heater relay or the like. In at least one embodiment, the temperature modification element 40 may be disposed to provide a modifying temperature to an opposed surface 42 of the substrate 18, that is a surface of the substrate 18 opposed to the surface 20 in contact with the representative fluid. Referring to FIG. 2, for example, the temperature modification element 140 may in the form of a rod 143 extending through at least a portion of a substrate 118 having a tubular structure 138. In an alternative embodiment, the substrate 18 itself may include the temperature modification element 40, as shown, for example, in FIG. 1. In FIG. 1, the substrate 18 may include a temperature modification element 40 that extends through or into the material of which the substrate is formed. In the illustrated embodiment, for example, surface 20 may be an outer surface of the rod 43 itself. By way of further example, a heated liquid may be pumped or otherwise circulated through the temperature modification element 40.

In order to evaluate a condition of the surface 20 of the substrate 18, heat transfer resistance through the substrate 18 may be determined. Those of skill in the art will appreciate that surface conditions such as corrosion and the deposit of minerals and other solids or fouling may affect the transfer of heat or coolness through the substrate and into the fluid.

In order to determine heat transfer resistance through the substrate 18, at least one temperature sensor is provided. In the embodiment of FIG. 1, a plurality of temperature sensors 44, 46, 48, 50 are provided. In at least one embodiment, at least a surface temperature sensor 44 is disposed to measure a temperature near or substantially adjacent the surface 20 of the substrate 18. While the surface temperature sensor 44 may be disposed at an alternative position along the substrate 18, in the embodiment illustrated in FIG. 1, the surface temperature sensor 44 is disposed proximal to an outlet end 52 of the substrate 18, that is, at or near the outlet end 52 where the representative fluid flows from the system for analyzing deposit 14. In this way, representative fluid that is at or near the outlet end 52 of the substrate 18 will presumably have reached a temperature that may closely approximate a temperature of the surface 20 of the substrate 18. Utilizing data from the temperature sensors 44, 46, 48, 50 as well as a temperature of the temperature modification element 40 and flow meter 17, a representative heat transfer resistance figure may be calculated.

In at least one embodiment, the surface temperature of the substrate 18 may be identified by an operator. In this mode of operation, the surface temperature is kept constant by a feedback control via the surface temperature sensor 44, the temperature modification element 40 and a control system 70 (discussed below), that is, algorithms associated with the control system 70. The temperature of the temperature modification element 40 may be increased or decreased to obtain a desired temperature at the surface temperature sensor 44. In this mode of operation, the overall heat transfer coefficient may be calculated, for example, based upon data from the temperature sensors 44, 46, 48, 50, the flow meter 17, and the temperature modification element 40. In a second mode of operation, power to the temperature modification element 40 may be kept constant, and the heat transfer resistance calculated based upon data from the temperature modification element 40 and the surface temperature sensor 44 as deposit conditions on the surface 20 change.

Additional sensors may be provided in order to provide a more precise representation of the heat transfer resistance through the substrate 18. For example, an inlet fluid temperature sensor 46 may be disposed to measure the temperature of fluid entering the conduit 16, an outlet fluid temperature sensor 48 may be disposed to measure the temperature of fluid exiting the conduit 16, and an ambient temperature sensor 50 may be disposed to measure the temperature surrounding the conduit 16.

In order to additionally monitor deposit that may occur on the surface 20 of the substrate 18 as a result of the flow of representative fluid from the fluid handling system 10, the system for analyzing deposit 14 includes at least one fluorometer 54 and at least one camera 56. In at least one embodiment, the fluorometer 54 and camera 56 are contained in a single unit, that is, the single unit is able to obtain both optical images and UV data. Such optical images may be, for example, digital images. It will be appreciated, however that the fluorometer(s) 54 and camera(s) 56 may be mounted together, or separately.

To provide the fluorometer(s) 54 and camera(s) 56 visual access to the surface 20 of the substrate 18, the conduit 16 includes at least one substantially transparent section 57 through which the surface 20 of the substrate 18 may be observed. In an embodiment wherein the conduit 16 is a quartz glass tube, the conduit 16 itself is transparent, allowing visual access to the surface of the substrate 18 contained therein. In at least one embodiment, the conduit 16 may contain one or more transparent sections 57 disposed in a position or positions allowing visual access to surface 20. In an embodiment wherein the conduit 16 itself incorporates the substrate 18, the conduit 16 may likewise include one or more such transparent sections 57. Those of skill in the art will appreciate that fluorescence and optical imaging data may be obtained through the representative fluid, while in other arrangements it may be desirable to drain the representative fluid from the conduit 16 before obtaining such data.

According to an aspect of this disclosure, the fluorometer(s) 54 and camera(s) 56 are configured to monitor fluorescence and provide a plurality of images at locations along the surface 20 of the substrate 18. Inasmuch as biofilm occurrence is random, that is, biofilm can start essentially anywhere along the conduit 16, this multipoint imaging may enhance reliability of data acquired for biofilm detection in particular. In at least one embodiment, five such monitoring locations and images are provided. In the embodiment of FIG. 1, the fluorometer 54 and camera 56 are movably mounted such that they may be advanced along the length of the substrate 18 to monitor fluorescence and acquire a plurality of images. The fluorometer 54 and camera 56 may be movably mounted by any appropriate arrangement. By way of example only, a mounting 58 of the fluorometer 54 and camera 56 may include an internally threaded section 60 that may be engaged with a threaded shaft 62 that may be rotated by a motor 64, rotation of the threaded shaft 62 advancing the fluorometer 54 and camera 56 to a plurality of locations along the substrate 18 in order to monitor fluorescence and obtain the plurality of images. In at least one embodiment, the fluorometer 54 and camera 56 are configured to scan the surface 20 of the substrate 18 between position sensors 66, 68 in an operator controlled time interval. Those of skill in the art will appreciate, however, that other arrangements may be provided to permit the fluorometer 54 and camera 56 to observe a plurality of locations.

In at least one embodiment, a fluorometer 54 and camera 56 are combined by using a UV sensitive camera, e.g., bare CCD or image intensified, to collect spatially resolved UV fluorescence with using the UV excitation light source and standard image using a white light source.

In at least one embodiment, a camera 56 is a hyperspectral imaging device providing wavelength dependent image analysis for improved classification of the deposit characteristics on the surface.

Alternatively or additionally, a plurality of fluorometers 154 and/or cameras 156 may be provided in order to monitor fluorescence and obtain a plurality of images of the surface 20 of the substrate 18. In the embodiment of FIG. 2, for example, three fluorometers 154 and three cameras 156 are spaced along the length of the conduit 116 proximal to a plurality of transparent sections 157. While the fluorometers 154 and cameras 156 are stationarily mounted in this embodiment, those of skill in the art will appreciate that one or more of the fluorometers 154 and cameras 156 may likewise be movably mounted.

Those of skill in the art will appreciate that the use of monitoring relative to fluorescence, optic and heat transfer conditions on the same surface 20 facilitates, the diagnosing of the nature of deposits, the stage or level of the deposits, and rate at which deposits form, particularly biofilms. The analysis of this information further facilitates the construction of effective treatment protocols to reduce or eliminate such deposit formation. The use of the three technological fields reduces the possible interference that may result from the use of a single technology. Moreover, obtaining data at multiple data points may increase the reliability of detecting, identification, and treatment.

Optical camera and image analyzing technology may be utilized in the identification of deposits resulting from general deposits, scale, corrosion and microbiological changes on the surface 20 by contrast change, color and color changes, surface texture, and coverage monitoring and accumulation outputs, in particular, relative to initial start point values. Fluorescence monitoring at the same areas facilitates identification of biofouling, that is, a biomass/biofilm portion of the deposits. Data regarding heat transfer resistance, as discussed above facilitates further refinement of the analyses, particularly when either or both of the fluorescence and optical signal are positive. The combined analyses based upon the three different types of input may be utilized to determine the basic nature of deposits on the surface 20 of the substrate 18, which is representative of deposits that may result in the fluid handling system 10. For example, in at least one embodiment, when both an optical signal and fluorescence monitoring results are positive, it would be indicative of biofouling, or biofouling and scaling. In at least one embodiment, if the optical signal is positive, but fluorescence monitoring is negative and corrosion is not observed, it would be indicative of general deposits or a scale control issue. In at least one embodiment, if the optical signal is positive and a brownish colored deposit is observed, it may be indicative of a corrosion issue where the deposit may not be affected by a chemical treatment cycle. Heat transfer data may further refine the analyses when either or both of the optical signal and fluorescence are both positive by determining the impact of fouling on the heat transfer, and by classifying the type of fouling, e.g., mineral or biofilm; the determination of the heat transfer resistance facilitates an estimation of the thickness.

According to another aspect of this disclosure, the data utilized to determine the heat transfer resistance, including readings from any or all of the sensors 44, 46, 48, 50 and flow meter 17, along with fluorescence data from the fluorometer(s) 54 and optical images from the camera(s) 56 may be utilized to evaluate deposits, and apply an appropriate chemical treatment from a source 80, such as a tank. The information may further be utilized in the formation or adjustment of a chemical treatment protocol for the larger fluid handling system 10.

Heat transfer resistance may be utilized to detect, characterize, and quantify corrosion. U.S. Publication 2018/0024031, which is incorporated herein for all purposes, discloses the use of an imaging system to monitor corrosion on a metal substrate. In the system for analyzing deposit 14 disclosed herein, heat transfer resistance may be utilized to detect microbial induced corrosion (MIC) and under deposit corrosion on the heated metal substrate. By way of example only, MIC corrosion on a mild steel substrate will appear as dark spots or regions on the metal substrate due to the corrosion products. Collecting a sequence of substrate images over time allows tracking the detection of a MIC feature and activity level, i.e., the rate of change in the MIC feature area. This provides an indication of the corrosion level and whether a treatment program quenching the corrosion rate. However, details on the impact of corrosion and classification, e.g., local versus general, may not be apparent because of a biofilm and/or scale coating on the substrate surface. By applying an in-situ chemical treatment procedure to the substrate surface 20, e.g., acid, bleach, etc., to remove the surface deposit, a clean image of the surface 20 may be captured. If corrosion exists, surface defects, e.g., pits, may be detectable in the image. Classification of the corrosion as local or general is then calculated based on the area coverage, typically, corrosion features covering over 50% of the substrate area being classified as general. In addition, an estimated corrosion rate may be determined based upon the time the substrate was exposed to the representative fluid prior to cleaning. While corrosion rates are generally determined by weight loss, in the disclosed system rates may be inferred from the image data.

Figure 3:
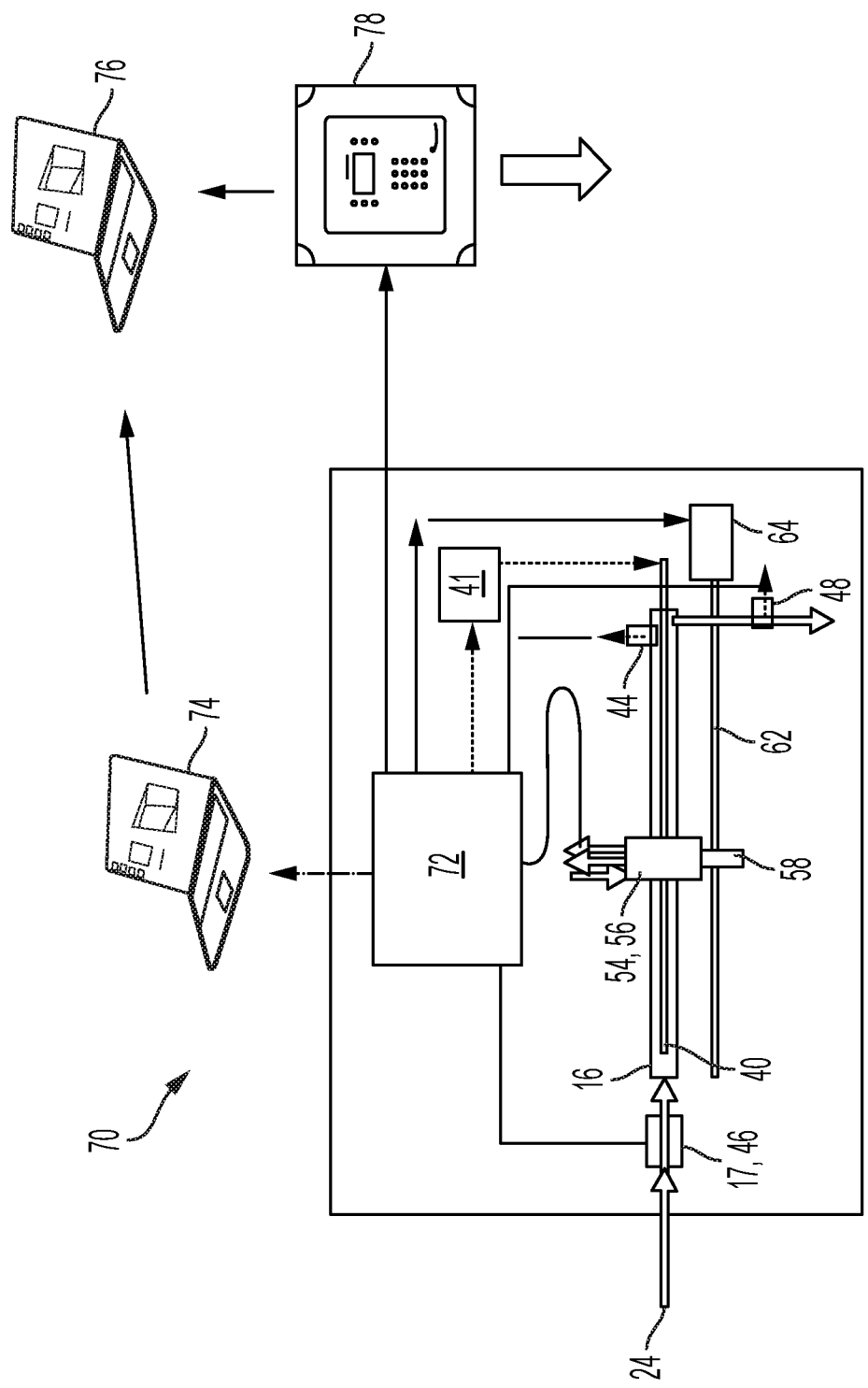

Referring to FIG. 3, data from the sensors 44, 46, 48 and flow meter 17, as well as data from the fluorometer(s) 54 and images from the camera(s) 56 at a plurality of positions along the substrate 18 are provided to a control system 70. The control system 70 includes at least one controller 72 and may include a user interface 74 and additional analysis software and hardware, server, or cloud system(s) 76, as well as fluid handling system treatment controls 78.

The control system 70 indicated generally by an arrow in FIG. 3 may operate to control certain aspects of the system for analyzing deposit 14. The control system 70 may be a stand-alone system that may communicate with one or more systems controlling aspects of the fluid handling system 10 or may control aspects of the fluid handling system 10.

The control system 70 may include components at the system for analyzing deposit 14 and may also include components located remotely from the system for analyzing deposit 14. As a result, the functionality of control system 70 may be distributed so that certain functions are performed at the system for analyzing deposit 14 and other functions are performed remotely, such as at a remote operations center. The control system 70 may include a communications system including both a wireless communications system and a wired communications system for transmitting signals between components.

The control system 70 may include an electronic control module or controller 72 that may receive various input signals from components of the system for analyzing deposit 14 as well information from the fluid handling system 10 via wireless communications system, wired communications systems, control systems and sensors associated with the system for analyzing deposit 14, or from any other source. The control system 70, including the controller 72, may control and provide input to the operation of the various aspects of the system for analyzing deposit 14, including the specific tasks and operations performed by components of the system for analyzing deposit 14.

The controller 72 may be an electronic controller that operates in a logical fashion to perform operations, execute control algorithms, store and retrieve data and other desired operations. The controller 72 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 72 such as power supply circuitry, signal conditioning circuitry, driver circuitry, and other types of circuitry.

The controller 72 may be a single controller or may include more than one controller disposed to control various functions and/or features of the control system 70. The term "controller" is meant to be used in its broadest sense to include one or more controllers and/or microprocessors that may be associated with the system for analyzing deposit 14 and that may cooperate in controlling various functions and operations at the fluid handling system 10. The functionality of the controller 72 may be implemented in hardware and/or software without regard to the functionality. The controller 72 may rely on one or more data maps as well as characteristics and capabilities of the components of the system for analyzing deposit 14 and the fluid handling system 10 that may be stored in the memory of controller. Each of these data maps may include a collection of data in the form of tables, graphs, equations, and/or historical data.

The control system 70 may be configured to control the operation of the motor 64 to control the location of the fluorometer 54 and the camera 56 along the conduit 16, as well as the operation of the fluorometer 54 and the camera 56. The control system 70 may be further configured to control or adjust cleaning or chemical treatment protocols of either or both of the fluid handling system 10 and the system for analyzing deposit 14.

The user interface 74 may be utilized to control and monitor a number of the aspects of the system for analyzing deposit 14, as well as other functions that will be clear upon reading the further discussion below. The user interface 74 may be utilized to, for example, direct control the number of images obtained, and the frequency at which the fluorometer 54 and camera 56 obtain images. By way of further example, the user interface may be utilized to set UV dose ranges for the fluorometer 54. In at least one embodiment, the auto fluorescence effective UV dose range for biofilm monitoring is range 0.01-5 $mJ/cm^2$ per half hour for obtaining optimized biofilm growth. The user interface 74 likewise may be utilized to control the flow rate of representative fluid through the system for analyzing deposit 14 by controlling inlet valve 22.

By controlling the UV dosage and tracking the fluorescence signal over time, the method provides a means to determine the level of biofouling. For example, the method may include applying a large UV dosage outside the standard range to kill the bacteria on the surface and then applying a normal UV dosage range for biofilm detection, i.e., to avoid quenching, and tracking the signal level provides an indication of the level of biofouling.

Via user interface 74 or/and controller 72, the control system 70 may be configured to apply various control algorithms in order to monitor and characterize and quantify biofouling conditions, corrosion, and deposit/scale. The configuration also can be done via independent computers or controllers via control programs. By way of example only, the control system 70 may be configured to characterize the nature of deposits, including biofouling conditions, send out alarms when needed, initiate or schedule system chemical treatment, adjust biocide protocols for preventative treatment as well as biofilm growth inhibition treatment. The control system 70 may be configured to monitor, characterize and quantify, and deposit problems, and initiate or adjust deposit control protocols. The control system 70 may further be configured to monitor, characterize and quantify, and alarm corrosion problems, and initiate or adjust a corrosion control protocol. The control system 70 may supply control operation and adjustment of the fluid handling system treatment controls 78 and/or, referring to FIG. 1, selective application of additives to the fluid handling system 10.

Prior to the initiation of and/or subsequent to completion of a monitoring cycle, a chemical treatment may be applied to surface 20. In the illustrated embodiment, a pump 82 may be operated to selectively pump chemical treatment from a source 80 through a check valve 84 through line 86. A chemical treatment is a chemical formulated to clean the deposits on the surface 20 of the substrate 18, sensor surfaces and the system for analyzing deposit 14 generally. The chemical treatment may be any appropriate chemical treatment, and may be dictated by type of fluid handling system 10 involved. By way of example, in at least one embodiment, the chemical treatment may be Nalco DC 14, a formulated chemical product for cleaning sensor and system surfaces.

Via the user interface 74, a chemical treatment sequence may be initiated and continued for a set period of time as scheduled by an operator or it may be initiated and continued for a set period as set by an operator or preset by the control system 70. In some embodiments, the chemical treatment sequence may be initiated by the control system 70 when the system for analyzing deposit 14 has identified the surface 20 to have reached predetermined deposit index level for a defined period of time; the specifics of the deposit index level and the defined period of time may be preset by an operator via the user interface 74.

A chemical treatment sequence may include, for example, the controller 72 turning off the heater relay 41, the system for analyzing deposit allowing the representative fluid to continue to run through the conduit 16 to allow the substrate 18 to cool down to the temperature of the representative fluid entering the system for analyzing deposit 14, that is the temperature as measured by the inlet fluid temperature sensor 46. The controller 72 directing the inlet valve 22 to close, the representative fluid may then be drained from the system for analyzing deposit 14 by the controller 72 causing the drain valve 26 and outlet valve 32 to open. The controller 72 then may direct the closure of drain valve 26 and outlet valve 32. The controller 72 may then cause operation of pump 82 for a period of time, as discussed above, in order to pump chemical treatment from source 80 through check valve 84 and line 86 to the conduit 16. The length of time for which the pump 82 operates may be calibrated to pump a required volume for treating the system for analyzing deposit 14. The chemical treatment then remains within the system for analyzing deposit 14 for a set period of time as discussed above, permitting the chemical treatment to react with the deposits. The controller 72 then directs the inlet valve 22 to open, allowing the representative fluid to flush through the chemical treatment and placing the system for analyzing deposit 14 back in service. In at least one embodiment, the controller 72 opens the outlet valve 32 to allow the representative fluid to flush the chemical treatment through to drain 30.

The fluorometer 54 and/or camera 56 may additionally be utilized during the cleaning treatment. By incorporating the fluorometer 54 and/or camera 56 during the cleaning steps, the resulting data may assist in a determination of the level of cleaning on the substrate 18, i.e., "proof-of-clean." If the level of cleaning of the substrate 18 is not sufficient after a cleaning cycle, then the process can be repeated. Tracking the number of cleaning cycles and length of the cleaning cycles in combination with the image analysis may serve as a target reference, and may provide an indication on the level of deposit on the substrate 18 as well as type. Data collected during cleaning process can be stored for comparison and/or trending over time.

Data obtained by the controller 72 may be provided to the user interface 74 or otherwise analyzed with the control system 70, and may, for example, be sent to server 76 independently or via controller 72 at schedulable frequency. In addition to data from the various sensors within the system, data from the fluorometer(s) 54 and camera(s) 56 may be provided to the controller 72 and elsewhere in the control system 70. For example, in at least one embodiment, biofilm detection is obtained via Ex280 and Em340 nm. In at least one embodiment, it has been determined that the signal from the fluorometer 54 is proportional to general bacterial concentration. Further, the control system 70 may analyze optical images provided by the camera 56 may be compared to optical images captured after a chemical treatment cycle to determine the extent of changes, including surface coverage percentages, per unit of time. Control algorithms within the control system 70 may then determine theoretic biofilm thickness in the deposit detected from bacterial concentration and coverage percentage.

Example 1

Figure 4:
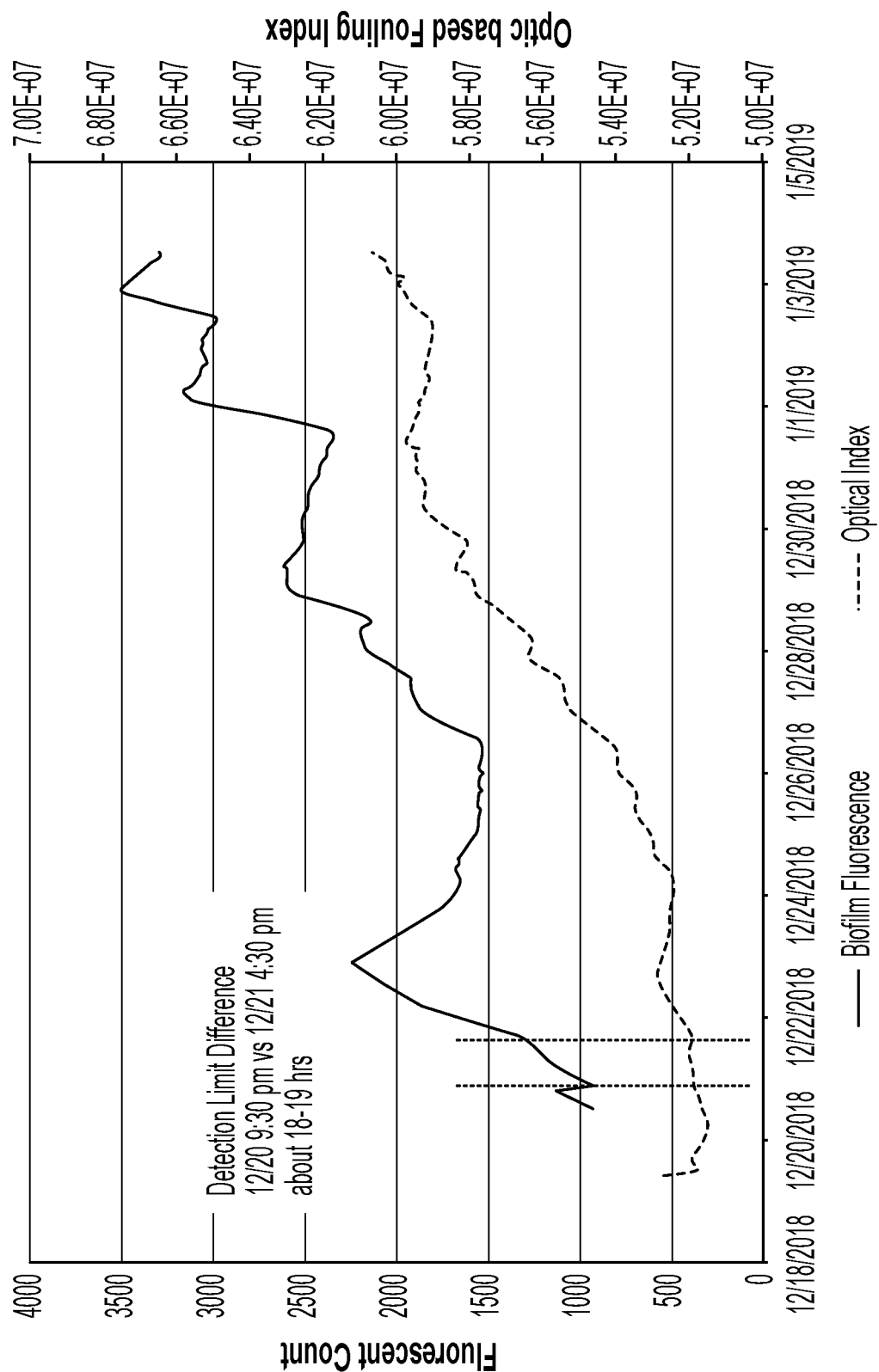
FIG. 4 is a chart illustrating an example of biofilm growth detection by autofluorescence and optic methods.

Turning to FIG. 4, there is shown an example of biofilm growth detection by autofluorescence and optic methods, more specifically, fluorescence and optic fouling index as a function of time. Fluorescent signal showed the dynamics of biofilm growth on the heater surface while the digital image analyses show relatively stable build ups. In this example, the digital image analysis consists of illuminating the surface with white light, capturing the image, and integrating the image to an overall intensity, thereby reducing the image to a single point. The fluorescence method detected biofilm growth about 18 hours earlier than the optical method in this example. The trend developed from the image analysis indicates that the deposit formation is on the substrate surface and is increasing with time. The fluorescence measurements provide classification of the deposit as a biofilm.

Example 2

Figure 5:
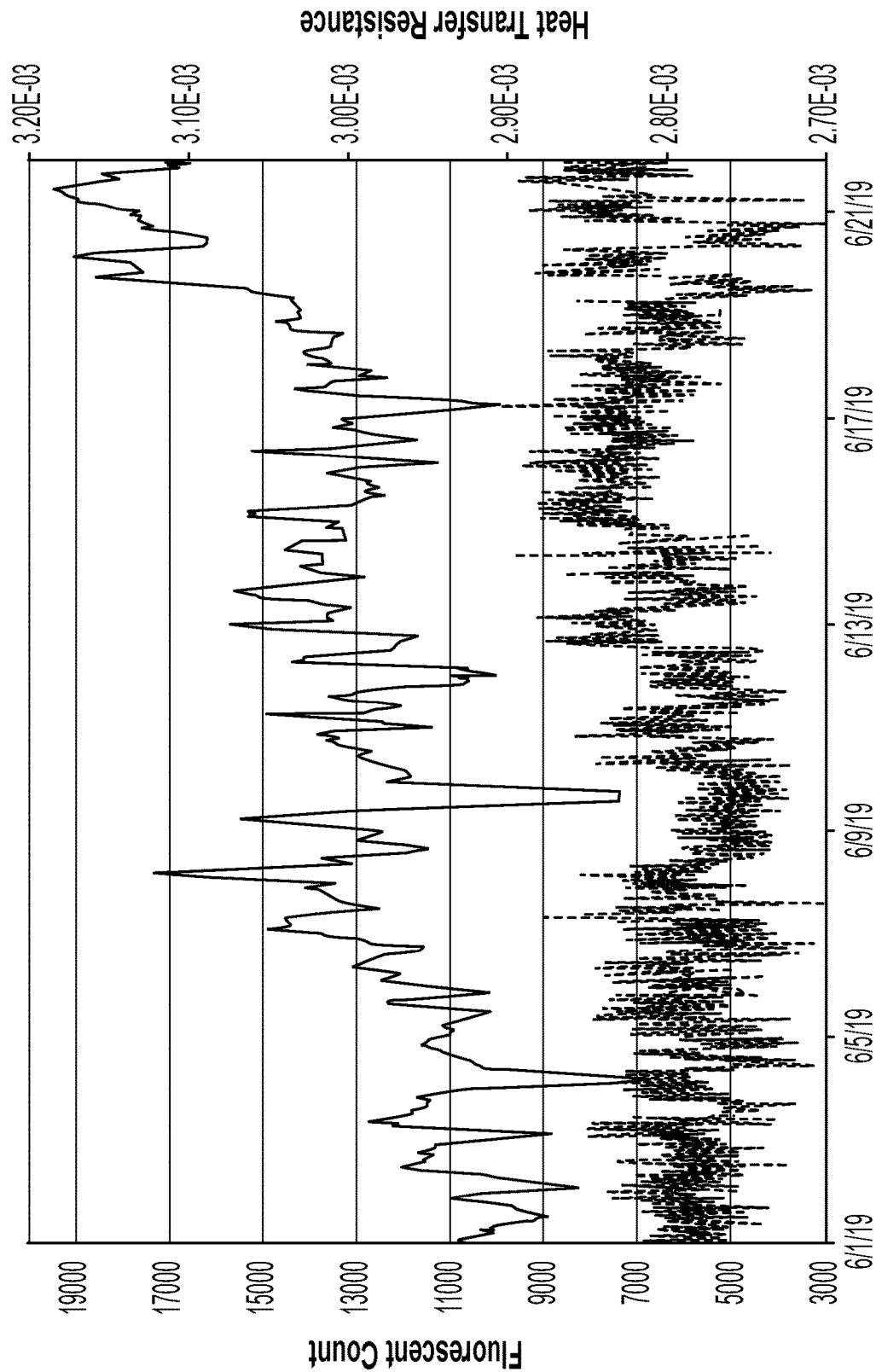
FIG. 5 is a chart illustrating an example of biofilm growth detected by autofluorescence and heat transfer resistance.

Turning to FIG. 5, there is shown an example of biofilm growth, detected by autofluorescence, compared with surface heat transfer resistance. The fluorescent signal displayed the dynamics of biofilm growth on the heater surface, while the heat transfer resistance showed a relatively delayed response since it is depended on the types, thickness, and surface coverage of the buildups, etc. In this example, the fluorescence method detected biofilm growth reliably days before the growth affected heat transfer efficiency. The autofluorescence showed more dynamics of the biofilm growth conditions on the monitored surface.

Example 3

Figure 6:
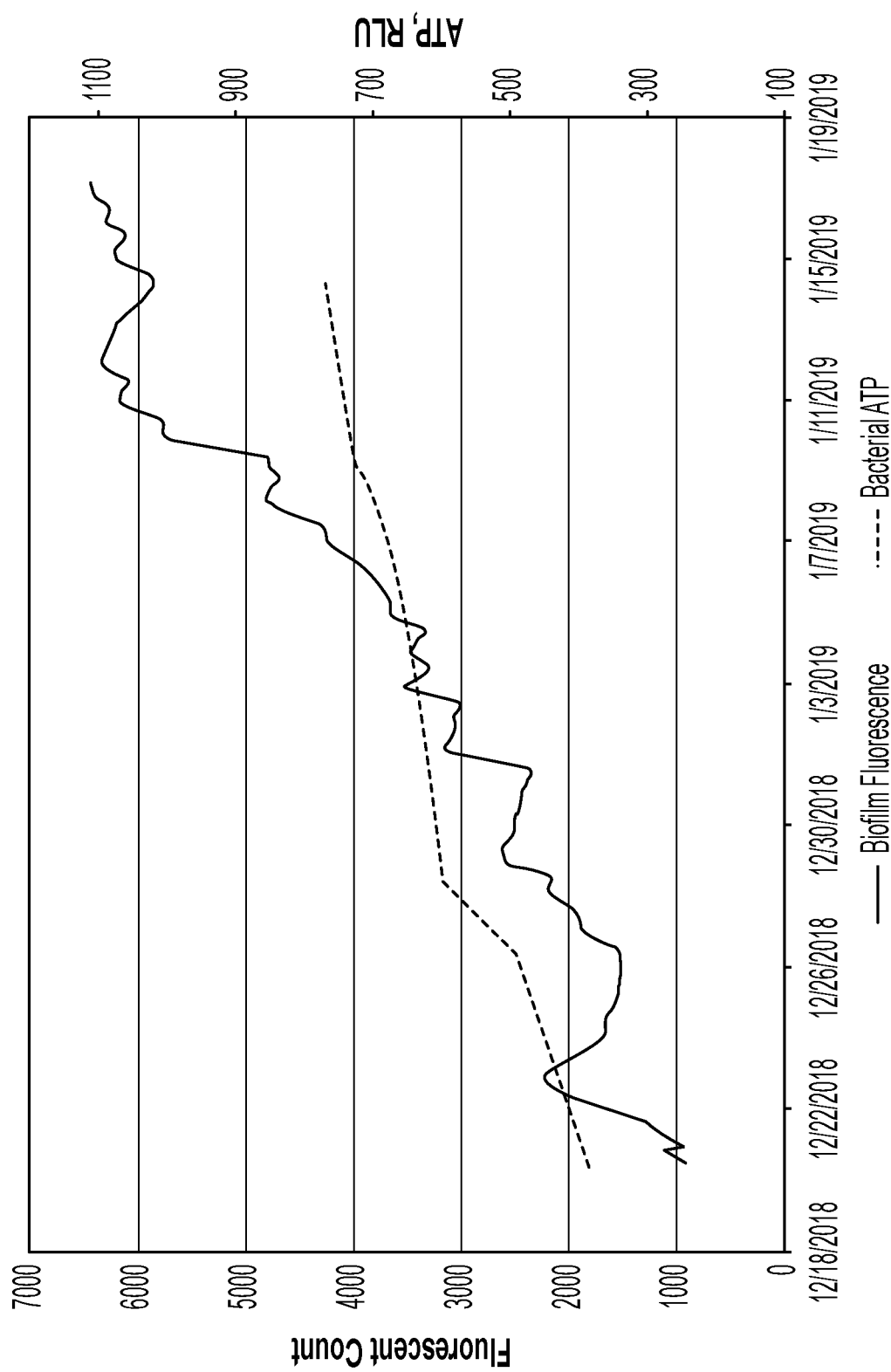
FIG. 6 is a chart illustrating an example of biofilm growth and bioactivity over time.

Turning to FIG. 6, there is shown an example of biofilm growth and compared with bacterial bioactivity, more specifically, fluorescence and bacterial ATP measurements as a function of time. Biofilm growth was detected by T1 fluorescence and bioactivity was determined by measuring bacterial ATP. Free ATP measurements on separated coupon surface were consistent with biofilm growth shown in this graph. The ATP levels were expressed as relative light units (RLU) by Hygiena's Ultrasnap system (Hygiena, ATP test product ASY0093 US 2020 Ultrasnap for Surface ATP Test, 2018).

Example 4

Figure 7:
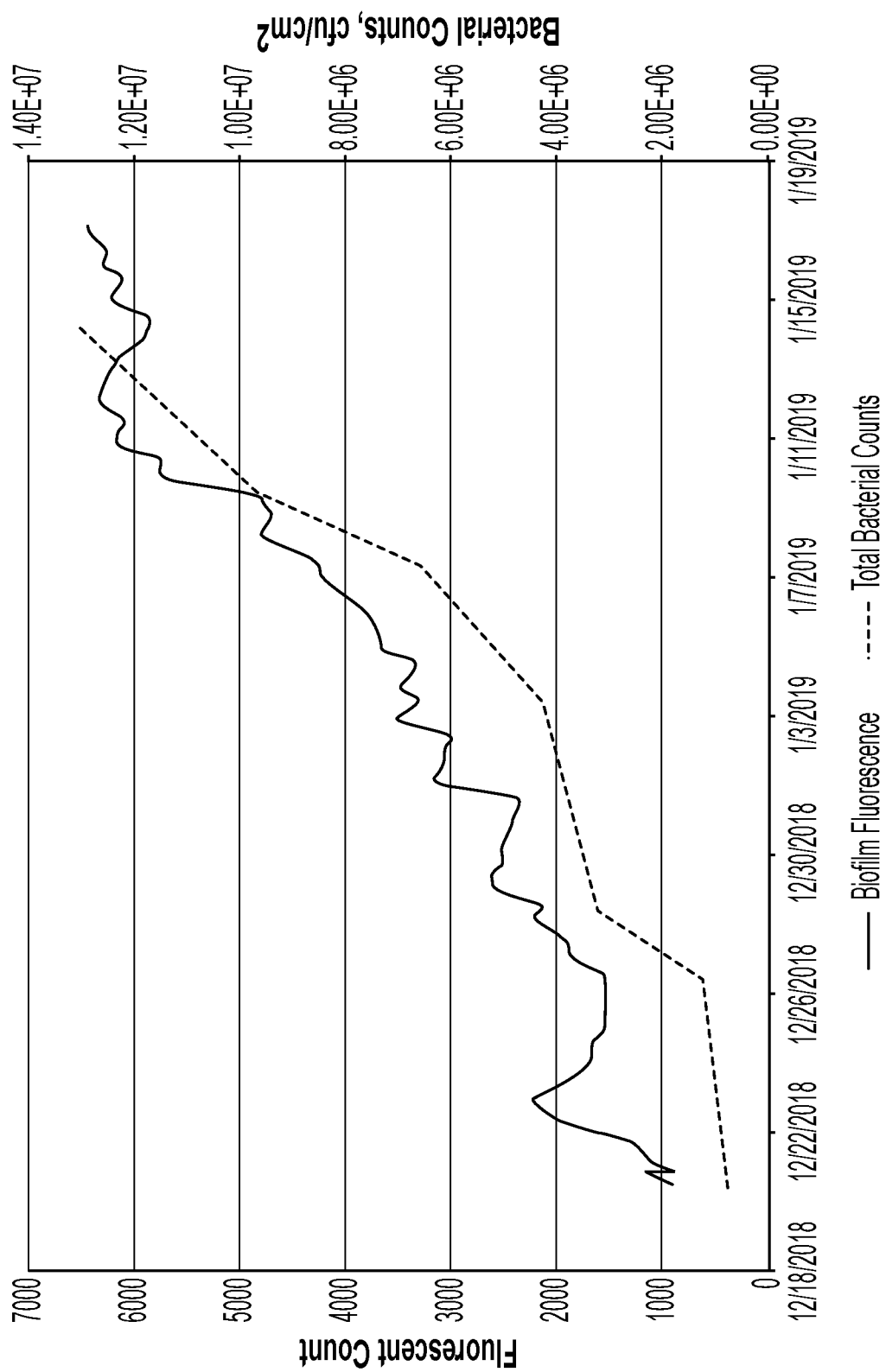
FIG. 7 is a chart illustrating an example of biofilm growth and bacterial counts over time.

Turning to FIG. 7, there is shown an example of biofilm growth (T1 fluorescence) and bacterial counts, more specifically, fluorescence and total bacterial counts as a function of time. Total viable bacteria (TVC) counts were determined from samples on separated coupon surface. Bacterial populations on coupon surfaces were sampled and numerated using plating technique. The 3M Petrifilm was used for total aerobic bacterial counts (3M Petrifilm Aerobic Count Plates, distributed by Lab Media, Product No. Part #LR11001). It was found that growth of total bacteria on coupon surfaces was very well correlated with biofilm growth on heater surfaces monitored by autofluorescence, as shown in this graph.

Example 5

Figure 8:
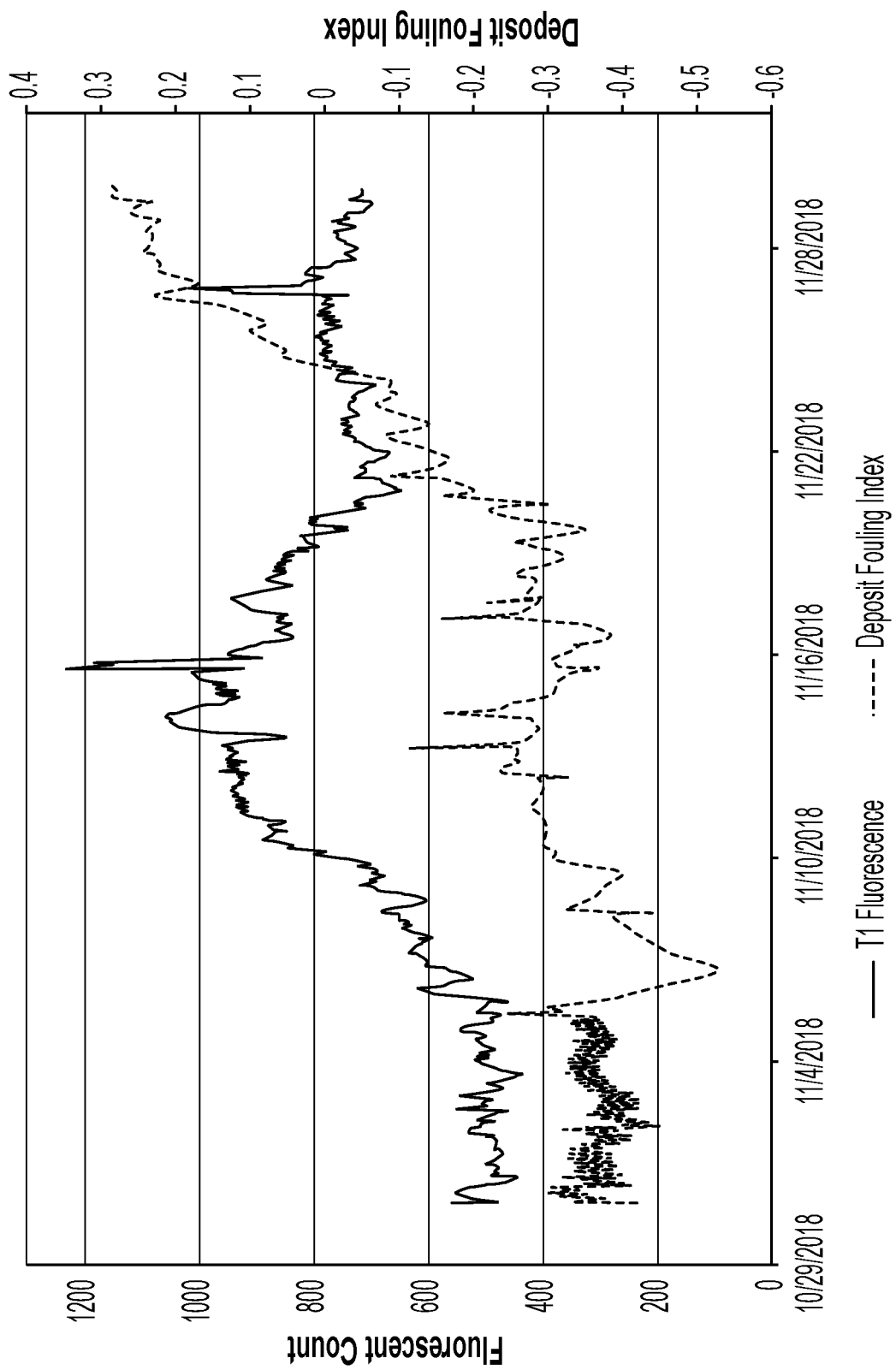
FIG. 8 is a chart illustrating an example of biofilm growth in a mixed deposit.

Turning to FIG. 8, there is shown an example of biofilm growth dynamics in a mixed deposit, more specifically, fluorescence and deposit fouling index as a function of time. Biofilm growth was detected by T1 fluorescence and the change in the mixed deposit was determined from Deposit Index. The Deposit Index may be an index generated by the output difference of a paired sensor output between a clean sensor and a fouled sensor over the output of the clean sensor at a given time. Biofilm growth on a surface depends on many factors. In this experiment, no treatment for scale, corrosion and microbial growth was applied in the cooling water. The fouling process is natural for both biofouling and scale under the cooling water operating conditions. The fluorescence decreased as the conditions of the surface deposits changes, as shown in the graph.

Example 6

Figure 9:
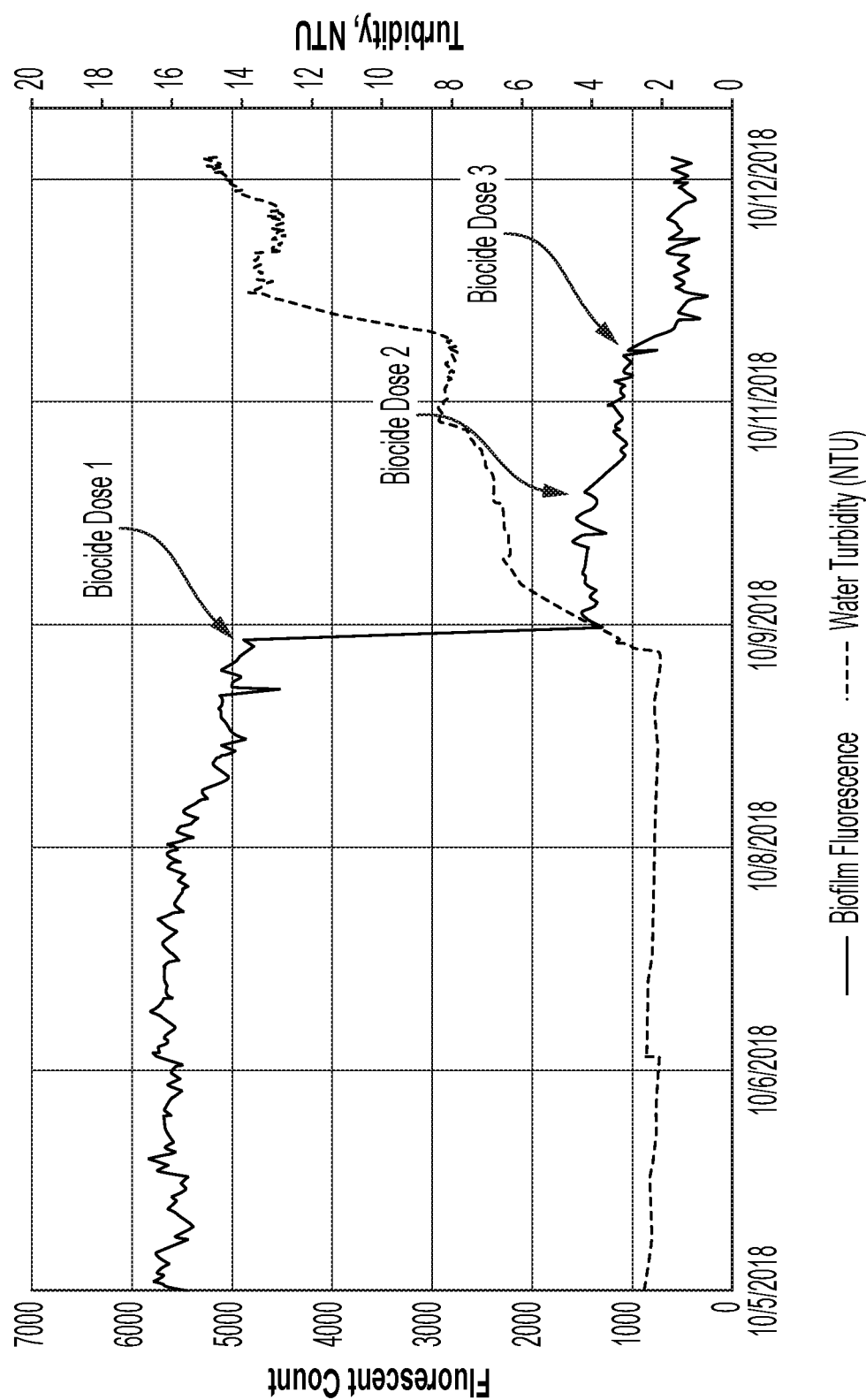
FIG. 9 is a chart illustrating an example of biofilm fluorescence and biocide treatment.

Turning to FIG. 9, there is shown an example of biofilm fluorescence and turbidity changes as a result of biocide treatment, more specifically, biofilm fluorescence, biocide treatments, and water turbidity as a function of time. The autofluorescence from biofilms was used to evaluate the biocide effect. When biocide dose 1 was applied, biofilm fluorescence decreased dramatically, as indicated in the graph. It was confirmed that the biofilm was destroyed and released from the surface by the increase in cooling water turbidity. The fluorescence decreased further as more biocides were dosed, as shown in the graph.

According to an aspect of this disclosure, there is provided a system for analyzing deposit within a fluid handling system having a system surface, the system for analyzing deposit including a conduit, the conduit adapted to be fluidly coupled to the fluid handling system to receive a flow of representative fluid from the fluid handling system, a substrate disposed within the conduit, the substrate having a surface disposed to contact the flow of representative fluid, the substrate being representative of the system surface within the fluid handling system, a temperature modification element, the temperature modification element being disposed to modify a temperature of the substrate, at least one temperature sensor, the temperature sensor being disposed to measure a heat transmitted through the substrate, at least one fluorometer, the at least one fluorometer being disposed to monitor fluorescence of the surface of the substrate at a plurality of fluorometer locations, and at least one camera, the at least one camera being disposed to provide optical images of the surface of the substrate at a plurality of camera locations. The system may further include a control system including at least one controller, the controller being configured to receive data from the at least one temperature sensor, the at least one fluorometer and the at least one camera, determine a level of heat transfer resistance through the substrate based upon temperature data received from the at least one temperature sensor, and determine at least one of a nature of the deposit and a level of the deposit based upon at least one of fluorescence data from the at least one fluorometer, optical data images received from the at least one camera, and heat transfer resistance.

According to another aspect of this disclosure, there is provided a method of determining deposit within a fluid handling system, the method including providing a flow of the representative fluid from the fluid handling system to a surface of a substrate representative of a system surface within the fluid handling system, providing temperature altering conditions to an opposed surface of the substrate, measuring heat transfer resistance through the substrate to the representative fluid, monitoring fluorescence of the surface of the substrate, acquiring optical images of the surface of the substrate, and at least one of characterizing a nature of deposit on the surface of the substrate and a level of deposit on the surface of the substrate based upon at least one of the monitored fluorescence, the optical images, and the heat transfer resistance.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An apparatus configured to supply data for use in analyzing a deposit within a fluid handling system having a system surface, the apparatus comprising:
   a length of a conduit, the conduit adapted to be fluidly coupled to the fluid handling system to receive a flow of representative fluid from the fluid handling system through the length of the conduit;
   a substrate disposed within the conduit, the substrate having a surface disposed to contact the flow of representative fluid, the substrate being representative of the system surface within the fluid handling system;
   a temperature modification element, the temperature modification element being disposed to modify a temperature of the substrate;
   at least one temperature sensor, the temperature sensor being disposed to measure a heat transmitted through the substrate;
   at least one fluorometer, the at least one fluorometer being disposed to monitor fluorescence of the surface of the substrate at a plurality of fluorometer locations; and at least one camera, the at least one camera being disposed to provide optical images of the surface of the substrate at a plurality of camera locations;

whereby data from one or more of the at least one temperature sensor, the at least one fluorometer, and the at least one camera are provided for analysis of the deposit.

2. The apparatus as claimed in claim 1 wherein at least one of
a plurality of cameras are provided at the plurality of camera locations, and
a plurality of fluorometers are provided at the plurality of fluorometer locations.

3. The apparatus as claimed in claim 1 wherein a plurality of cameras is provided at the plurality of camera locations and a plurality of fluorometers is provided at the plurality of fluorometer locations.

4. The apparatus as claimed in claim 1 wherein the at least one camera is movably mounted to provide optical images of the surface of the substrate at the plurality of camera locations and the at least one fluorometer is movably mounted to monitor fluorescence of the surface of the substrate at the plurality of fluorometer locations.

5. The apparatus as claimed in claim 4 further including a motor adapted to move the at least one of the camera to the plurality of camera locations and the at least one fluorometer to the plurality of fluorometer locations.

6. The apparatus as claimed in claim 1 including a plurality of temperature sensors, the plurality of temperature sensors including at least one of a substrate temperature sensor, an ambient temperature sensor, a representative fluid inflow temperature sensor, and a representative fluid outflow temperature sensor.

7. The apparatus as claimed in claim 1 further including a supply of a chemical treatment fluidly coupled to selectively supply a flow of the chemical treatment to the substrate.

8. The apparatus as claimed in claim 1 wherein the conduit includes an inside surface, the inside surface including the substrate and wherein at least a portion of the conduit is transparent.

9. The apparatus as claimed in claim 1 further including a control system including at least one controller, the controller being configured to
receive data from the at least one temperature sensor, the at least one fluorometer and the at least one camera,
determine a level of heat transfer resistance through the substrate based upon temperature data received from the at least one temperature sensor, and
determine at least one of a nature of the deposit and a level of the deposit based upon at least one of fluorescence data from the at least one fluorometer, optical data images received from the at least one camera, and heat transfer resistance.

10. The apparatus as claimed in claim 9 wherein the controller is further configured to perform at least one of the following:
send out an alarm when at least one of a threshold type and a level of deposit of the threshold type, and a preset type and a level of deposit of the preset type is identified on the surface of the substrate,
initiate a chemical treatment when at least one of the threshold type and the level of deposit of the threshold type, and the preset type and the level of deposit of the preset type is identified on the surface of the substrate, and adjust at least one of a biocide program for preventative treatment, biofilm inhibition treatment program, and a deposit and scale control program based upon data received from at least one of the at least one temperature sensor, the at least one fluorometer, and the at least one camera, and the at least one of the threshold type of and the level of deposit of the threshold type, and a preset type and a level of deposit of the preset type identified.

11. A method of characterizing a deposit within a fluid handling system, the method comprising:
providing a flow of the representative fluid from the fluid handling system to a surface of a substrate representative of a system surface within the fluid handling system;
providing temperature altering conditions to an opposed surface of the substrate;
measuring heat transfer resistance through the substrate to the representative fluid;
monitoring fluorescence of the surface of the substrate;
acquiring optical images of the surface of the substrate;
wherein monitoring fluorescence and acquiring optimal images of the surface of the substrate includes at least one of monitoring fluorescence of the surface of the substrate at a plurality of locations and acquiring optical images of the surface of the substrate at a plurality of locations; and
at least one of characterizing a nature of the deposit on the surface of the substrate and a level of deposit on the surface of the substrate based upon at least one of the monitored fluorescence, the optical images, and the heat transfer resistance.

12. The method of characterizing a deposit within a fluid handling system as claimed in claim 11 wherein providing the flow of the representative fluid from the fluid handling system to the surface of the substrate representative of the system surface within the fluid handling system includes providing a substrate that includes a similar material and surface roughness as the system surface within the fluid handling system.

13. The method of characterizing a deposit within a fluid handling system as claimed in claim 11 wherein providing the flow of the representative fluid from the fluid handling system includes fluidly coupling a conduit including the substrate to the fluid handling system, and providing the flow of representative fluid to the conduit.

14. The method of characterizing a deposit within a fluid handling system as claimed in claim 11 including at least one of
providing the flow or representative fluid includes providing a flow of representative fluid that simulates a shear stress experienced by fluid within the fluid handling system, and
providing temperature altering conditions to the opposed surface includes providing temperature altering conditions that simulate temperature conditions representative of temperatures experienced by the system surface within the fluid handling system.

15. The method of characterizing a deposit within a fluid handling system as claimed in claim 11 wherein measuring heat transfer resistance through the substrate includes measuring at least one of a representative fluid outflow temperature, an ambient temperature, a temperature of representative fluid flowing to the substrate, a temperature of the surface of the substrate, and a temperature of the temperature modification element.

16. The method of characterizing a deposit within a fluid handling system as claimed in claim 11 including at least one of
monitoring fluorescence includes moving a fluorometer to the plurality of fluorometer locations along the substrate and measuring the fluorescence of the surface of the substrate at the plurality of fluorometer locations, and
acquiring optical images includes moving a camera to the plurality of camera locations along the substrate and providing optical images of the surface of the substrate at a plurality of camera locations.

17. The method of characterizing a deposit within a fluid handling system as claimed in claim 11 including at least one of
measuring the fluorescence includes acquiring measuring fluorescence with a plurality of fluorometers disposed at the plurality of fluorometer locations, and
acquiring optical images includes acquiring optical images from a plurality of cameras at the plurality of camera locations.

18. The method of characterizing a deposit within a fluid handling system as claimed in claim 11 including at least one of
sending out an alarm when at least one of a threshold type and a level of deposit of the threshold type, and a preset type and a level of deposit of the preset type is identified on the surface of the substrate,
initiating a chemical treatment when at least one of the threshold type and the level of deposit of the threshold type, and the preset type and the level of deposit of the preset type is identified on the surface of the substrate,
adjusting at least one of a biocide program for preventative treatment, biofilm inhibition treatment program, and a deposit and scale control program based upon data received from at least one of the at least one temperature sensor, the at least one fluorometer, and the at least one camera, and the at least one of the threshold type of and the level of deposit of the threshold type, and the preset type and the level of deposit of the preset type identified, and
performing a mechanical cleaning of the surface of the substrate when at least one of a predetermined type of deposit and a predetermined level of deposit is determined.

19. The method of characterizing a deposit as claimed in claim 11 further including at least one of
chemically treating and cleaning the surface of the substrate to create a cleaned surface, acquiring optical images of the cleaned surface of the substrate, and comparing the optical images of the cleaned surface of the substrate with a previously acquired digital image of the substrate, and
identifying if corrosion changes have occurred to the cleaned surface of the substrate.

20. The method of characterizing a deposit as claimed in claim 11 further including performing an image analysis to characterize corrosion as general or local, and adjusting a corrosion inhibitor treatment program based on corrosion level and type.

* * * * *

UNITED STATES PATENT AND TRADEMARK OFFICE
CERTIFICATE OF CORRECTION

PATENT NO. : 11,662,314 B2
APPLICATION NO. : 17/078836
DATED : May 30, 2023
INVENTOR(S) : Kun Xiong et al.

It is certified that error appears in the above-identified patent and that said Letters Patent is hereby corrected as shown below:

In the Claims

In Column 20, Line 7, before "and the" delete "of"

In Column 22, Line 9, before "and the" delete "of"

Signed and Sealed this
Twelfth Day of December, 2023

Katherine Kelly Vidal
*Director of the United States Patent and Trademark Office*